US012430716B2

(12) United States Patent
Joung et al.

(10) Patent No.: US 12,430,716 B2
(45) Date of Patent: Sep. 30, 2025

(54) SEE-THROUGH CAMERA APPARATUS

(71) Applicant: SAMSUNG ELECTRO-MECHANICS CO., LTD., Suwon-si (KR)

(72) Inventors: Il Kweon Joung, Suwon-si (KR); Won Kyu Jang, Suwon-si (KR); Hee Sung Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 324 days.

(21) Appl. No.: 18/104,488

(22) Filed: Feb. 1, 2023

(65) Prior Publication Data

US 2023/0281774 A1    Sep. 7, 2023

(30) Foreign Application Priority Data

Mar. 4, 2022   (KR) .......................... 10-2022-0028111

(51) Int. Cl.
  *G06V 10/26* (2022.01)
  *G06F 3/14* (2006.01)
  *G06T 5/50* (2006.01)
  *H04B 1/40* (2015.01)
  *H04N 23/55* (2023.01)

(52) U.S. Cl.
  CPC ................ *G06T 5/50* (2013.01); *G06F 3/14* (2013.01); *G06V 10/26* (2022.01); *H04B 1/40* (2013.01); *H04N 23/55* (2023.01); *G06T 2207/20221* (2013.01)

(58) Field of Classification Search
None
See application file for complete search history.

(56) References Cited

U.S. PATENT DOCUMENTS

2020/0021745 A1*  1/2020  Ogura ................... H04N 23/60

FOREIGN PATENT DOCUMENTS

| KR | 10-2064086 B1 | 1/2020 |
| KR | 10-2020-0013728 A | 2/2020 |
| WO | WO 2019/002165 A1 | 1/2019 |

OTHER PUBLICATIONS

Li et al., "Through-Wall Human Pose Estimation Using Radio Signals", 2018. (Year: 2018).*
Zhao et al., "RF-Baed 3D Skeletons", 2018. (Year: 2018).*
Adib et al., "Capturing the Human Figure Through a Wall", ACM, 2015. (Year: 2015).*

* cited by examiner

*Primary Examiner* — Nicholas R Wilson
(74) *Attorney, Agent, or Firm* — NSIP Law

(57) ABSTRACT

A see-through camera apparatus includes a camera unit configured to acquire a first image of a scene, an RF sensor unit configured to receive an RF received signal and obtain a second image of the scene corresponding to a blind spot-object obscured by an obstacle based on the RF received signal, and an image processor configured to generate a third image based on the first image and the second image.

16 Claims, 10 Drawing Sheets

SEE-THROUGH CAMERA APPARATUS

CROSS-REFERENCE TO RELATED APPLICATION(S)

This application claims the benefit under 35 USC 119(a) of Korean Patent Application No. 10-2022-0028111 filed on Mar. 4, 2022, in the Korean Intellectual Property Office, the entire disclosure of which is incorporated herein by reference for all purposes.

1. FIELD

The present disclosure relates to a see-through camera apparatus.

2. DESCRIPTION OF RELATED ART

Camera modules are commonly applied to devices such as autonomous vehicles, drone devices, robots, medical devices, smart homes, CCTVs, and intelligent management systems, and may perform sensor or image capturing functions.

Cameras are currently the most widely used sensors based on their advantages of being able to grasp accurate shape information (signs, pedestrians, etc.) and their high price competitiveness compared to radar and lidar. For example, cameras are applied as sensors to a Lane Departure Warning System (LDWS), a Lane Keep Assist System (LKAS), and an Autonomous Emergency Braking (AEB) system.

In addition, there are many cases in which the advanced driving assistance system is based on a radar sensor, and the related radar sensor-based advanced driving assistance technology is mainly used for automatic driving functions or preventing collisions in advance by detecting a vehicle in front.

Existing camera devices may include multiple cameras, and in this case, situations in all directions may be monitored with images.

However, even in a camera device equipped with multiple cameras, since there may be a blind spot due to an obstacle that the camera cannot see, there is a problem in that it may be impossible to detect moving objects such as objects or animals that suddenly jump out of a blind spot.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a see-through camera apparatus includes a camera unit configured to acquire a first image of a scene, an RF sensor unit configured to receive an RF received signal and obtain a second image of the scene corresponding to a blind spot-object obscured by an obstacle based on the RF received signal, and an image processor configured to generate a third image based on the first image and the second image.

The RF sensor unit may be further configured to obtain an image pattern for the blind spot-object and generate the second image including the image pattern, based on the RF received signal.

The RF sensor unit may include an antenna unit configured to receive the RF received signal; an RF signal processing unit configured to extract the RF received signal reflected from the blind spot-object, among signals received through the antenna unit; and a pattern recognition and data processing unit configured to recognize an image pattern for the blind spot-object based on the RF received signal, and generate the second image including the image pattern.

The antenna unit may include a multi-array antenna including a plurality of antennas.

The see-through camera apparatus may further include a display unit configured to output an image corresponding to the third image to a screen.

The image processor may be further configured to generate the third image corresponding to a composite image including the pattern image by overlapping the first image corresponding to a surrounding image with the second image including the pattern image corresponding to the blind spot-object.

The camera unit may include an optical unit, including a lens unit including a plurality of lenses, configured to obtain an optical signal reflected from the blind spot-object caused by the obstacle; an optical signal processing unit configured to convert the optical signal acquired by the optical unit into an electrical signal; and a data processing unit configured to acquire the first image based on the electrical signal.

The camera unit may further include an actuator unit configured to control movement of the lens unit, and a control circuit unit configured to control an operation of the actuator unit.

In one general aspect, a see-through camera apparatus includes a camera unit, including a lens unit and an actuator unit, configured to acquire a first image of a scene based on an optical signal incident through the lens unit having a position controlled by the actuator unit; an RF sensor unit configured to receive an RF received signal and obtain a second image of the scene corresponding to a blind spot-object obscured by an obstacle based on the RF received signal; and an image processor configured to generate a third image by overlapping the first image and the second image, and output the third image to a display unit.

The RF sensor unit may be further configured to obtain an image pattern for the blind spot-object, and generate the second image, including the image pattern, based on the RF received signal.

The RF sensor unit may include an antenna unit configured to receive the RF received signal; an RF signal processing unit configured to extract the RF received signal reflected from the blind spot-object, among signals received through the antenna unit; and a pattern recognition and data processing unit configured to recognize an image pattern for the blind spot-object based on the RF received signal, and generate the second image including the image pattern.

The antenna unit may include a multi-array antenna comprising of a plurality of antennas.

The see-through camera apparatus may further include the display unit configured to output the third image to a screen.

The image processor may be further configured to generate the third image corresponding to a composite image, including the pattern image, by overlapping the first image corresponding to a surrounding image with the second image including the pattern image corresponding to the blind spot-object.

The camera unit may include an optical unit, including the lens unit, configured to obtain an optical signal reflected from a blind spot-object by the obstacle; an optical signal processing unit configured to convert the optical signal acquired by the optical unit into an electrical signal; and a data processing unit configured to acquire the first image based on the electrical signal.

The camera unit may further include a control circuit unit configured to control an operation of the actuator unit.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
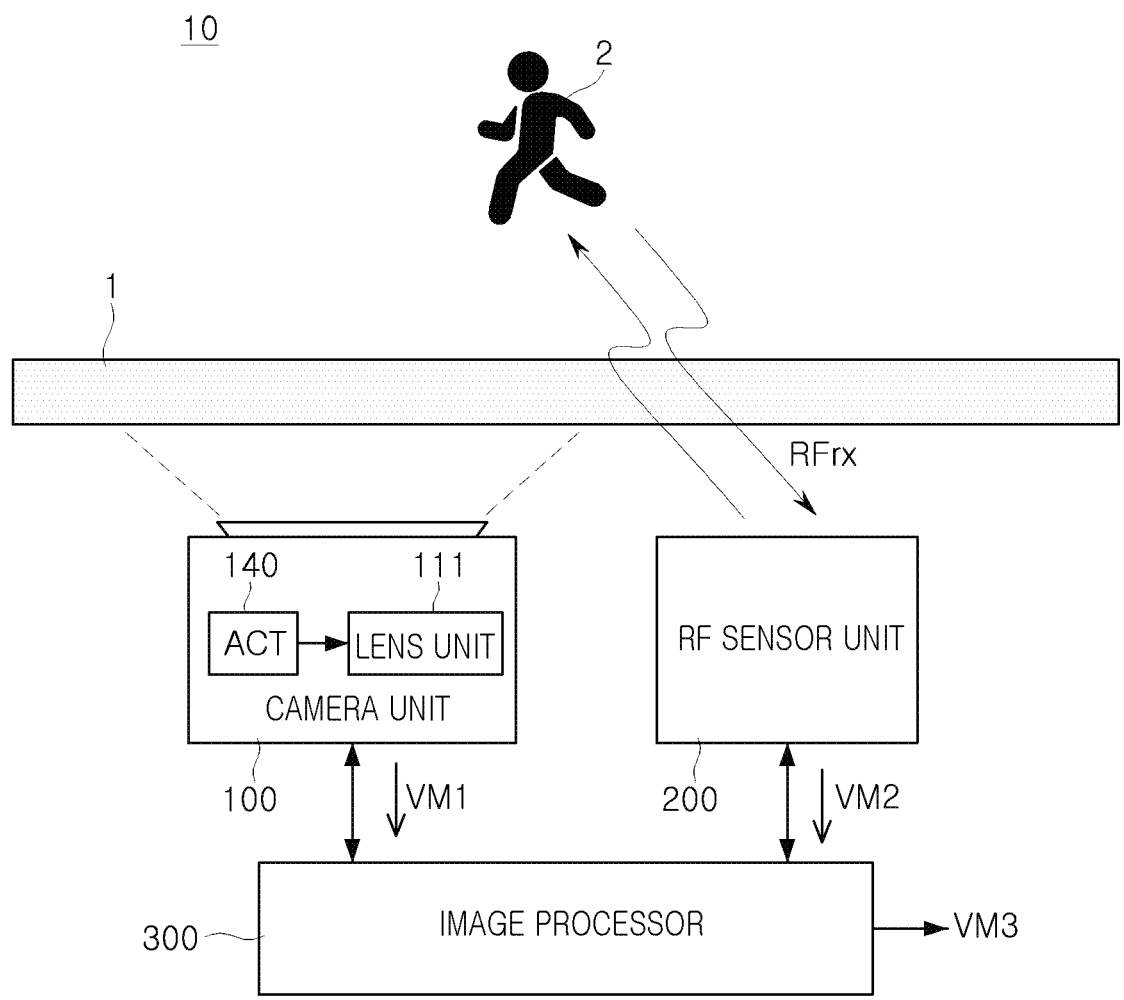
FIG. 1 is a schematic view of a see-through camera apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
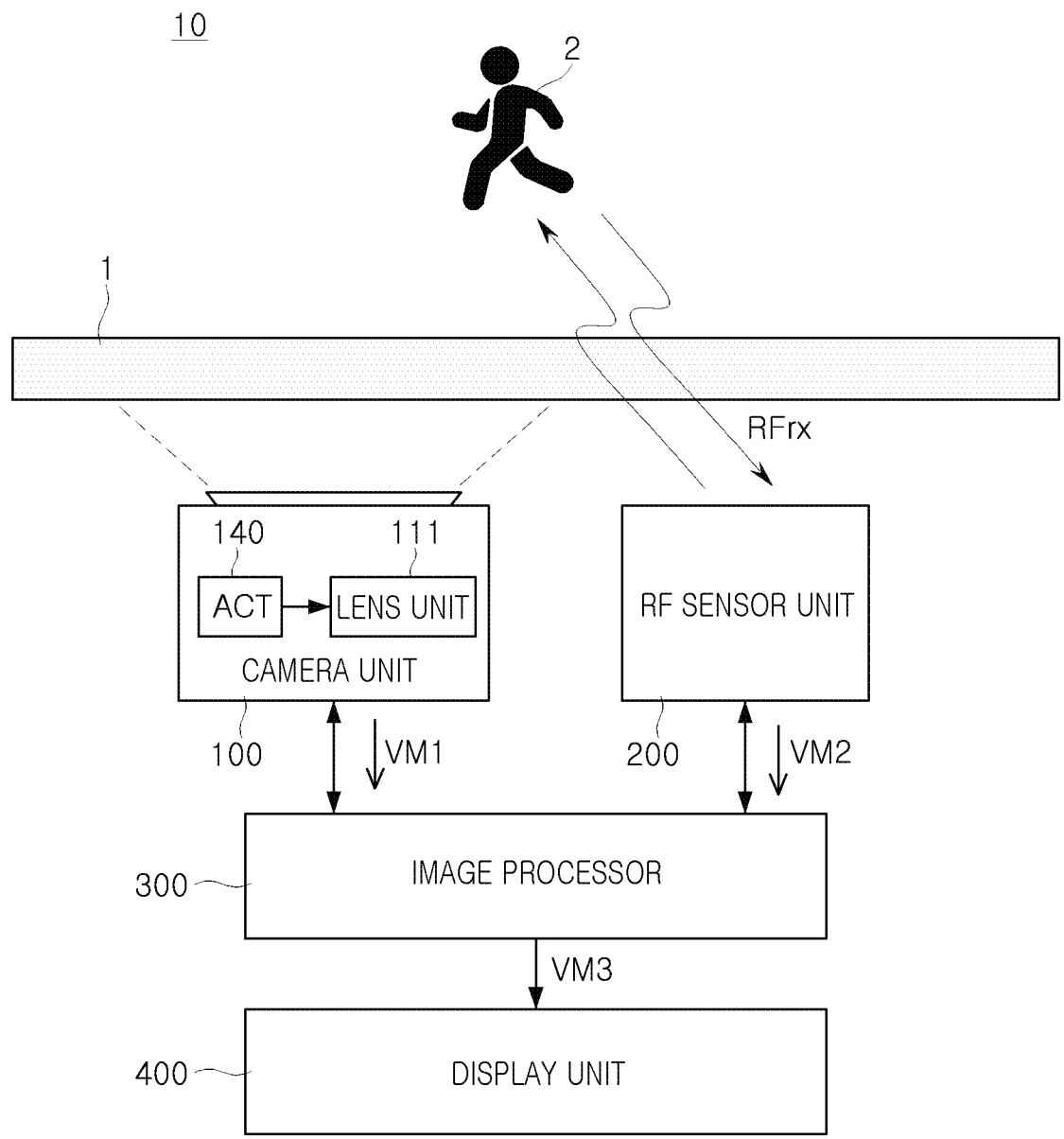
FIG. 2 is an illustrative diagram of a see-through camera apparatus according to an example.

FIG. 1 is a schematic view of a see-through camera apparatus according to an example, and FIG. 2 is an example view of a see-through camera apparatus according to an example.

Referring to FIGS. 1 and 2, a see-through camera apparatus 10, according to an example, may include a camera unit 100, an RF sensor unit 200, and an image processor 300. The see-through camera apparatus may have a structure in which the camera unit 100, the RF sensor unit 200, and the image processor 300 are integrated.

The camera unit 100 may include a lens unit 111 and acquire a first image VM1 based on an optical signal incident through the lens unit 111. The lens unit 111 may include a plurality of lenses, and the positions of at least a portion of the plurality of lenses may be adjusted by an actuator unit 140.

Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The RF sensor unit 200 may be configured to receive an RF received signal RFrx, and based on the RF received signal RFrx, may obtain a second image VM2 corresponding to a blind spot-object 2 present in the blind spot caused by an obstacle 1.

For example, the RF sensor unit 200 may obtain an image pattern for the blind spot-object 2 based on the RF received signal RFrx, and may generate the second image VM2 including this image pattern.

For example, the RF sensor unit 200 may include an RF transceiver having RF transmission and RF reception functions, and may receive the RF received signal RFrx reflected by the blind spot-object 2 by transmitting an RF transmission signal using the RF transceiver.

The image processor 300 may be configured to receive the first image VM1 from the camera unit 100 and receive the second image VM2 from the RF sensor unit 200, and may generate a third image VM3 based on the first image VM1 and the second image VM2.

For example, the image processor 300 may overlap the second image VM2, including the pattern image corresponding to the blind spot-object 2, on the first image VM1 corresponding to the surrounding image to generate the third image VM3 corresponding to the composite image, including the pattern image.

Referring to FIG. 2, for example, the see-through camera apparatus 10 may further include a display unit 400. The display unit 400 may output a perspective image corresponding to the third image VM3 to the screen.

For example, the camera unit 100 may include the lens unit 111 and the actuator unit 140. The camera unit 100 may obtain the first image VM1 based on an optical signal incident through the lens unit 111, of which a position is controlled by the actuator unit 140.

For respective drawings of the present disclosure, unnecessary, redundant descriptions of components having the same reference numerals and same functions may be omitted, and possible differences may be described for respective drawings.

Figure 3:
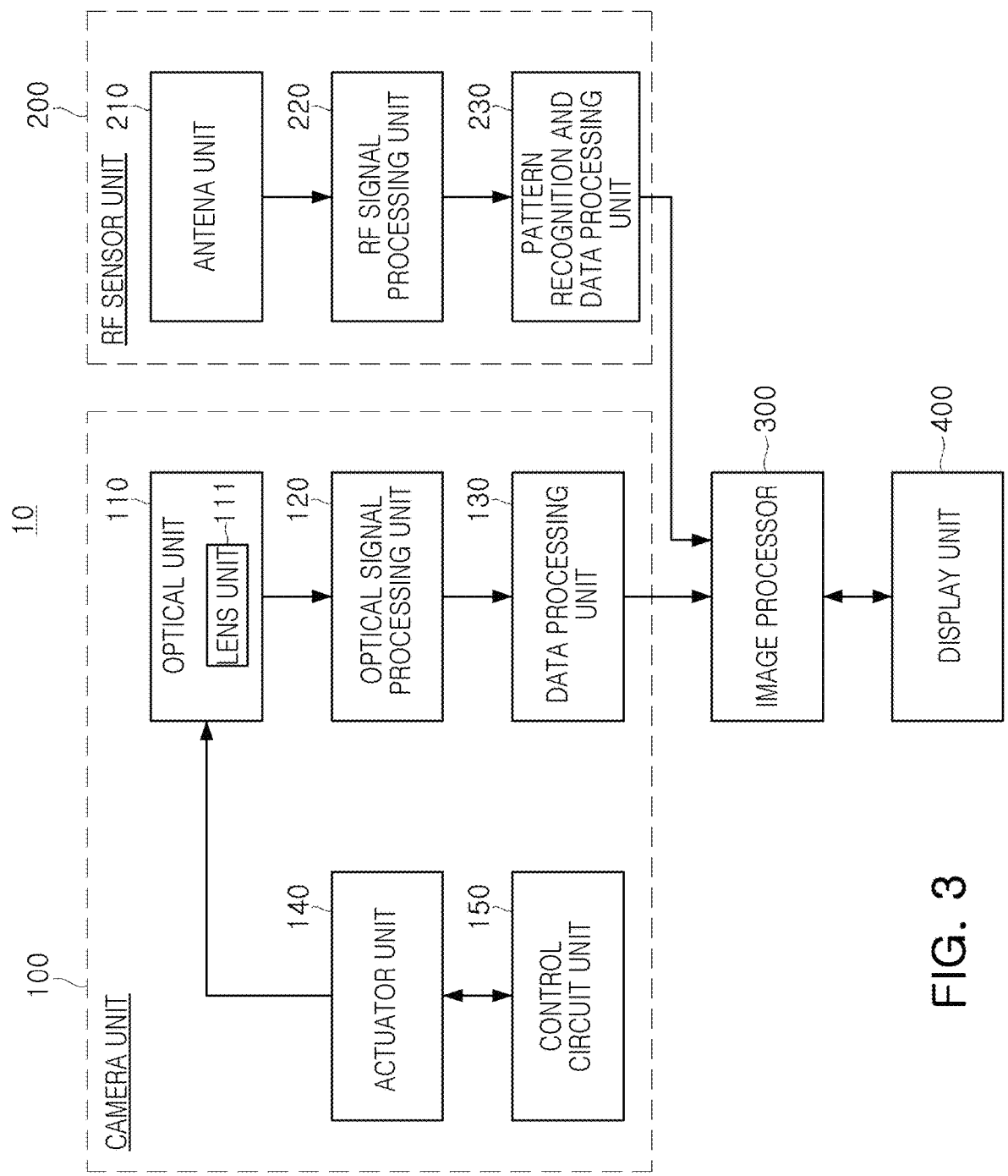
FIG. 3 illustrates an example of a camera unit and an RF sensor unit.

FIG. 3 illustrates an example of a camera unit and an RF sensor unit.

Referring to FIG. 3, for example, the camera unit 100 may include an optical unit 110, an optical signal processing unit 120 (optical signal processor 120), and a data processing unit 130 (data processor 130).

The optical unit 110 includes the lens unit 111, including a plurality of lenses, and may obtain an optical signal reflected from the blind spot-object 2 by the obstacle 1. (See FIG. 9A, for example).

The optical signal processing unit 120 may convert the optical signal acquired by the optical unit 110 into an electrical signal.

The data processing unit 130 may obtain the first image VM1 based on the electrical signal and output the first image VM1 to the image processor 300.

Also, for example, the camera unit 100 may further include the actuator unit 140 and a control circuit unit 150. The actuator unit 140 may adjust the positional movement of the lens unit 111 of the optical unit 110. The control circuit unit 150 may control the operation of the actuator unit 140.

The RF sensor unit 200 may include an antenna unit 210, an RF signal processing unit 220, and a pattern recognition and data processing unit 230.

The antenna unit 210 may include at least one antenna and receive an input RF received signal RFrx.

The RF signal processing unit 220 (RF signal processor 220) may extract the RF received signal RFrx reflected from the blind spot-object 2 from among signals received through the antenna unit 210.

The pattern recognition and data processing unit 230 may recognize the image pattern for the blind spot-object 2 based on the RF received signal RFrx, generate the second image VM2, including the image pattern, and output the second image VM2 to the image processor 300.

For example, the RF signal processing unit 220 and the pattern recognition and data processing unit 230 may be configured as a separate IC, respectively, or may be implemented as a single IC.

Figure 4:
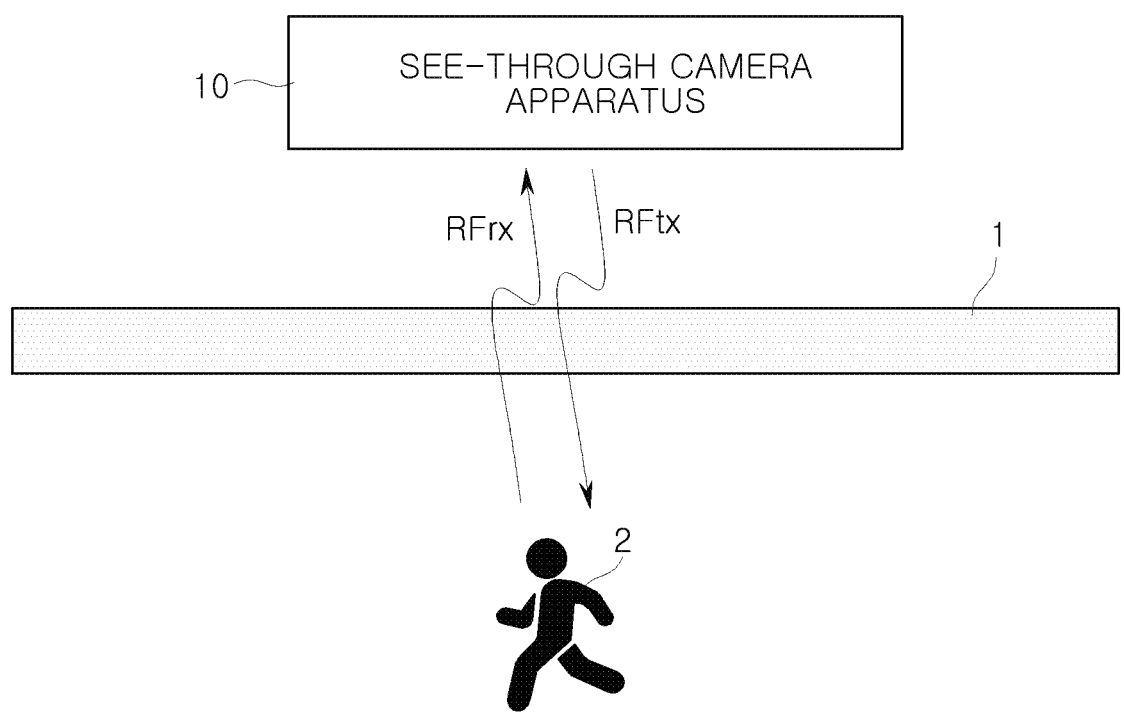
FIG. 4 is an explanatory operation diagram of a see-through camera apparatus.

FIG. 4 is an explanatory operation diagram of a see-through camera apparatus.

Referring to FIGS. 1 to 4, when the see-through camera apparatus 10 transmits an RF transmission signal RFtx, the RF transmission signal RFtx may penetrate through the obstacle 1 and reach the blind spot-object 2 present in the blind spot caused by the obstacle 1.

In addition, the see-through camera apparatus 10 may receive the RF received signal RFrx reflected by the blind spot-object 2.

For example, in the see-through camera apparatus 10, in the case of using the RF sensor unit using Wi-Fi technology, a mobile phone to which the see-through camera apparatus 10, according to an example of the present disclosure is applied, may freely access the Internet through Wi-Fi in a private dwelling, subway, or public facility.

On the other hand, for example, various obstacles such as concrete walls, trees, or glass windows may exist in the living space. Still, according to an example of the present disclosure, the mobile phone to which the see-through camera apparatus 10 may access the Internet through Wi-Fi communications without being obstructed by such obstacles. By using the Internet, the blind spot-object 2 may be more accurately seen therethrough.

In general, Wi-Fi signals have the property of being able to penetrate through obstacles such as concrete walls or furniture, and being able to penetrate through such obstacles is closely related to the frequency of the RF signal. For example, Wi-Fi may communicate using a signal with a frequency of 2.5 GHz to 5 GHz, an RF signal with a lower frequency has a relatively greater wavelength, and an RF signal with a higher frequency has a relatively shorter wavelength. In this case, the lower the frequency, the easier it is to pass through obstacles. Therefore, according to an example of the present disclosure, the see-through camera apparatus uses the characteristics of the RF signal described above.

In the present disclosure, the RF signal is not used for communication but as a sensor, and by imaging the signal of the RF sensor unit 200 and performing data processing so that the image overlaps an image of the camera unit 100. As a result, the object in the blind spot may be identified by seeing through the obstacle.

For example, the image processor 300 (FIGS. 1 to 3) may generate an image including an image pattern, such as a silhouette of a person or object, based on the collected RF received signal. Of course, since the location of objects over time may be checked, the video pattern of the image may also identify the moving direction or motion of the object. In this paper, the object is a concept that includes people or things that move with the passage of time.

Figure 5:
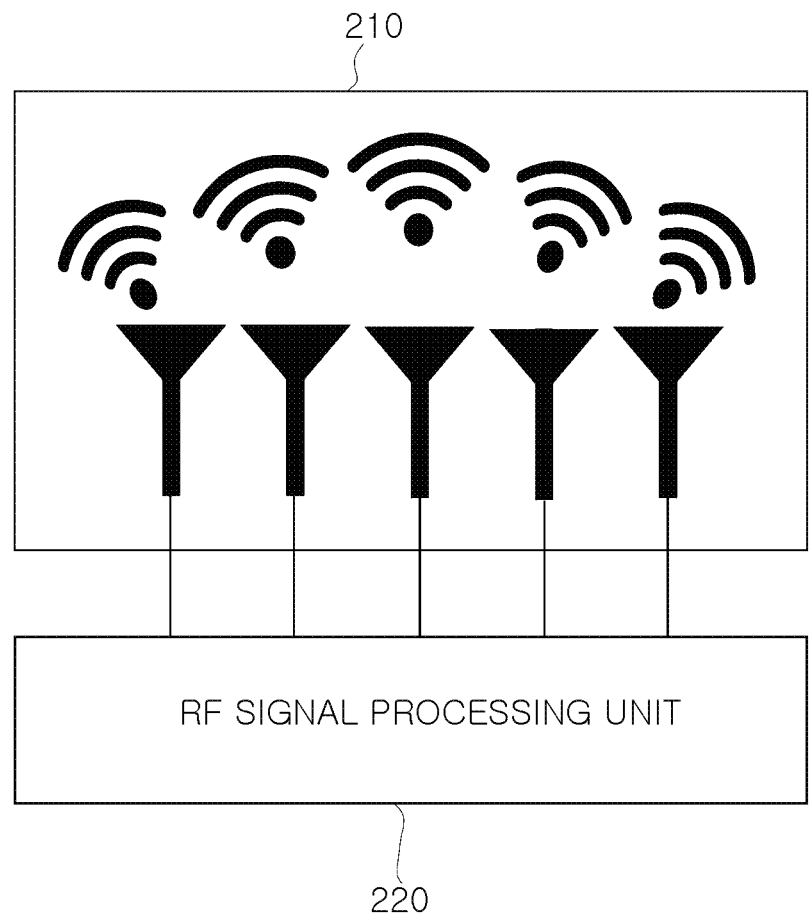
FIG. 5 illustrates an example of an antenna in an antenna unit.

FIG. 5 illustrates an example of the antenna in the antenna unit.

Referring to FIG. 5, the antenna unit 210 may include a multi-array antenna comprised of a plurality of antennas.

For example, using the see-through camera apparatus according to an example of the present disclosure, although simply checking the presence or motion of an object behind an obstacle, and the like, may be implemented with a single antenna, a multi-array antenna including a plurality of antennas may be used to more accurately detect the moving direction or speed.

Figure 6:
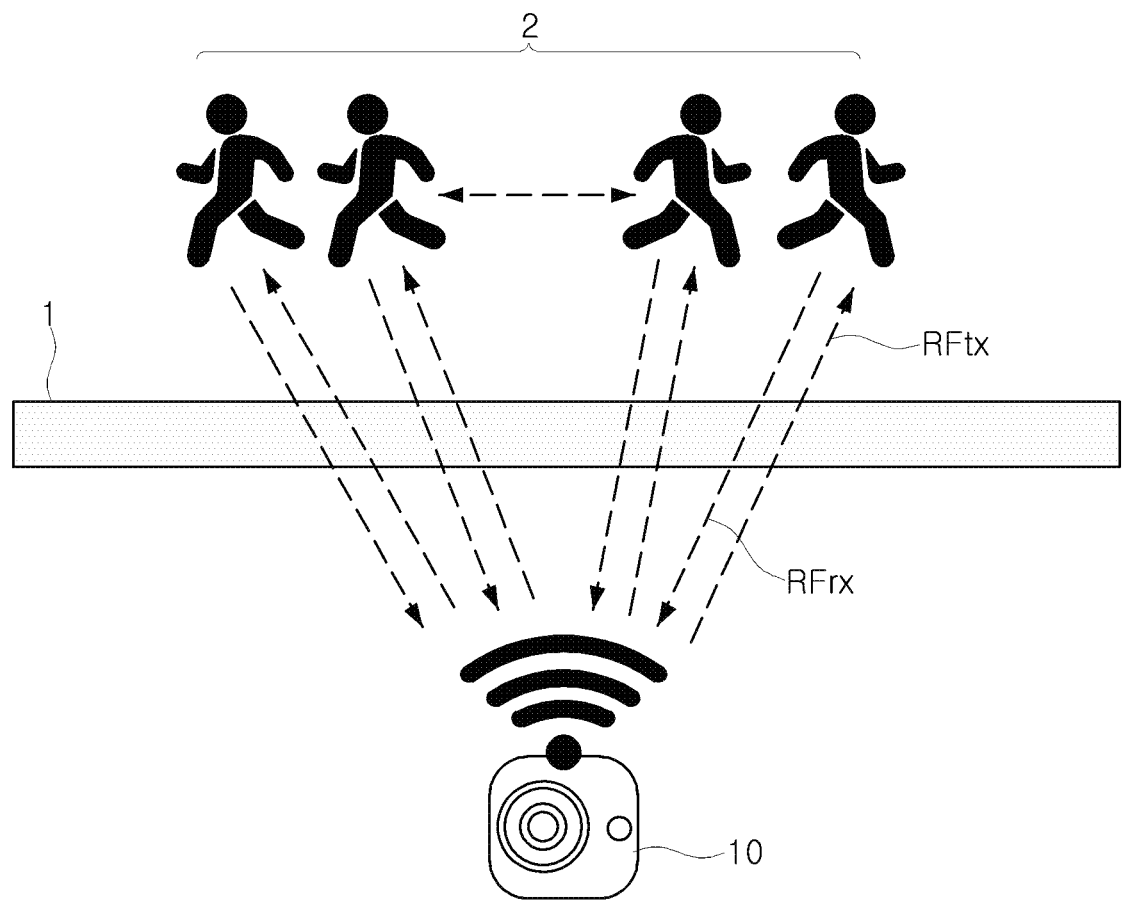
FIG. 6 is an explanatory diagram of a see-through operation of a see-through camera apparatus.

FIG. 6 is an explanatory view of the perspective operation of the see-through camera apparatus.

Referring to FIGS. 1 to 6, the see-through camera apparatus 10 may transmit an RF transmission signal RFtx and receive an input RF received signal RFrx.

For example, the RF transmission signal RFtx may be radiated through an antenna and pass through the obstacle 1, such as a wall, to reach the object 2 across the obstacle 1.

The RF received signal RFrx reflected from the object 2 and returned may be received through the antenna of the see-through camera apparatus 10.

Figure 7:
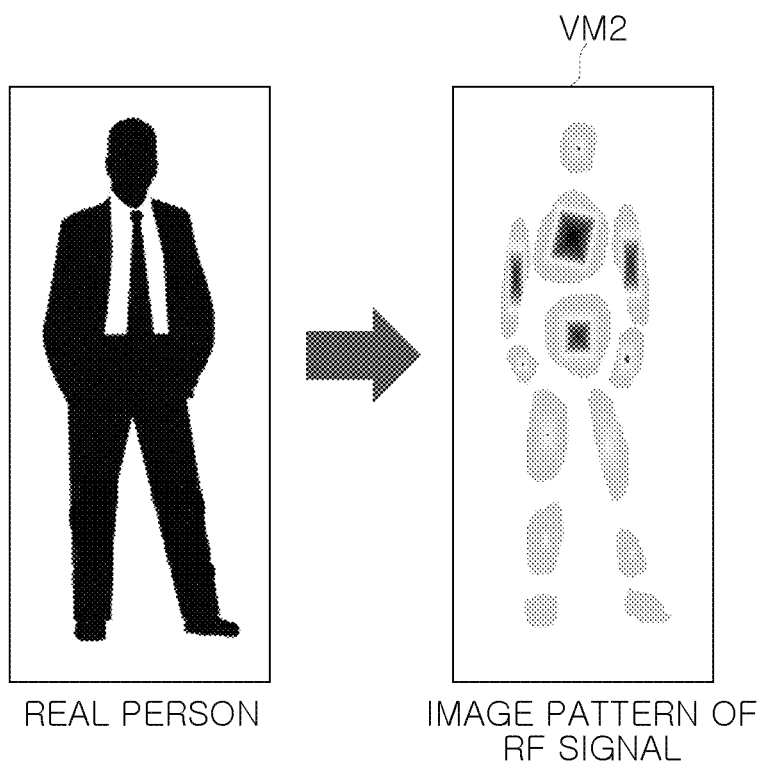
FIG. 7 illustrates an example of a real person and an image pattern by an RF sensor unit.

FIG. 7 illustrates an example of an image pattern by a real person and an RF sensor unit.

Referring to FIGS. 3 and 7, as described above, the RF sensor unit 200 of the see-through camera apparatus 10 may acquire a second image VM2, including a video pattern, by photographing a real person.

On the other hand, in the see-through camera apparatus 10, according to an example, the frequency of RF transmission and reception signals may be used based on a desired need by considering the resolution, sensing distance, obstacle permeability, and the like. For example, the lower the frequency, the higher the obstacle seeing effect. For example, Wi-Fi may communicate using a signal with a frequency of 2.5 GHz to 5 GHz.

Figure 8:
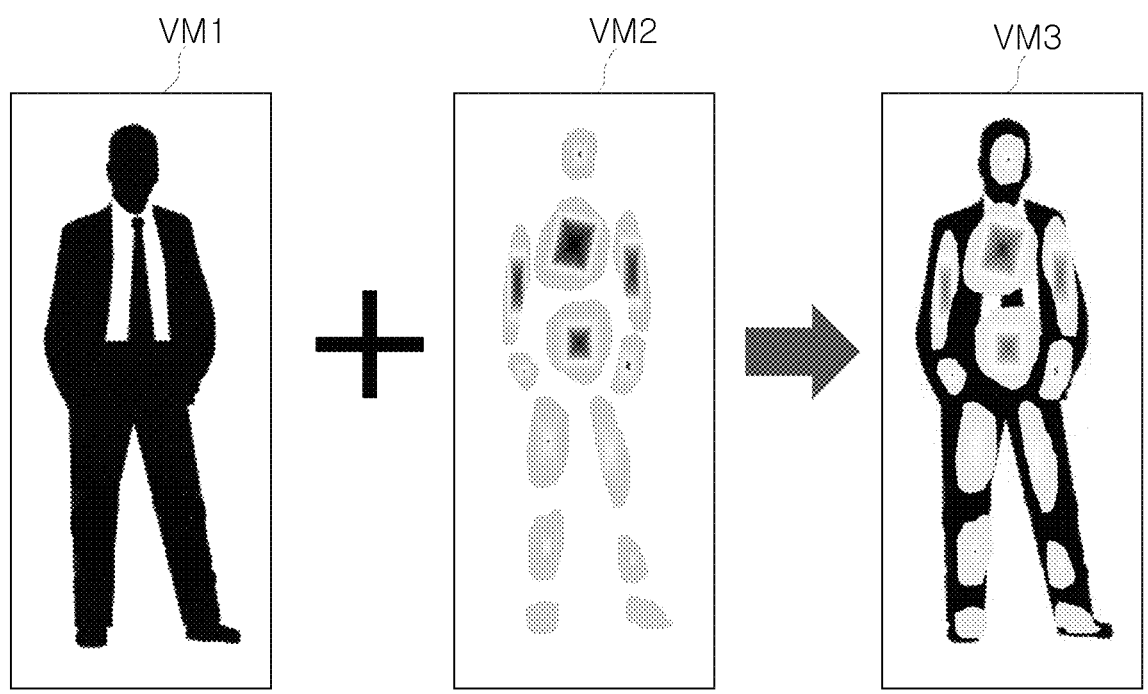
FIG. 8 illustrates an example of a first image, a second image, and a third image.

FIG. 8 illustrates an example of a first image, a second image, and a third image.

Referring to FIGS. 1 to 8, VM1 may be the first image, which is an actual image that may be obtained through the camera unit 100, VM2 may be a second image formed of image patterns that may be acquired through the RF sensor unit 200, and VM3 may be a third image obtained by image processing the first image (actual image) and the second image VM2 so that they overlap through data processing.

Figure 9A:
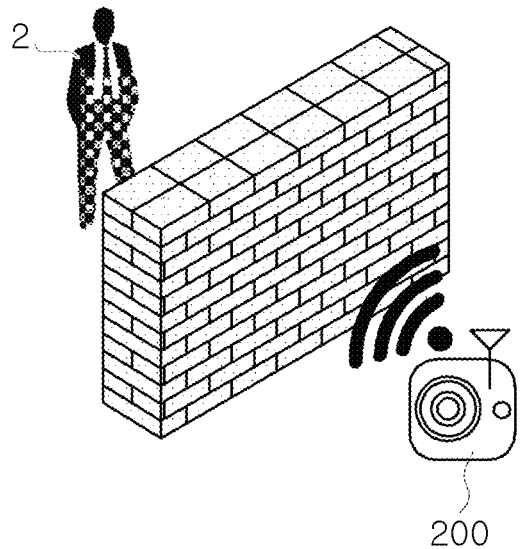
FIG. 9A illustrates an example of a person in a blind spot.
Figure 9B:
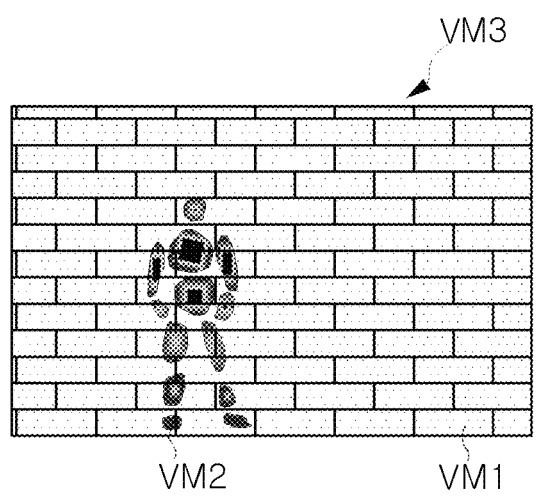
FIG. 9B illustrates an example of the situation of FIG. 9A captured with a see-through camera apparatus.

FIG. 9A illustrates an example of a person in a blind spot. FIG. 9B is an example of an image of FIG. 9A taken by a see-through camera apparatus.

As illustrated in FIG. 9A, in the case in which there is a person in the blind spot behind the obstacle, when a person 2 behind the obstacle 1 illustrated in FIG. 9A is photographed through the see-through camera apparatus according to an example of the present disclosure, as illustrated in FIG. 9B, a third image VM3, including the second image VM2, a perspective image, may be obtained.

Figure 10A:
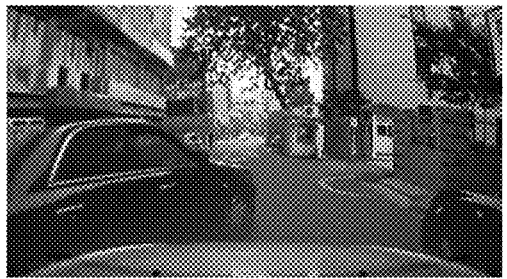
FIG. 10A is an example of an image diagram of a general camera.
Figure 10B:
FIG. 10B is an illustrative image diagram of a see-through camera apparatus according to an example of the present disclosure.

FIG. 10A is an example of an image of a general camera. FIG. 10B is an example of an image of a see-through camera apparatus, according to an example of the present disclosure.

The picture illustrated in FIG. 10A is an example of an image obtained from an existing vehicle camera without an RF sensor unit. FIG. 10A illustrates a scene of a vehicle parked in an alleyway, another vehicle passing in front, and a fence at the entrance of an apartment complex. In this case, existing automotive cameras cannot determine whether another person is behind the vehicle passing in the front.

For example, when a child suddenly jumps out from behind the captured vehicle, or a pedestrian or cyclist appear from behind the wall of the apartment entrance, existing cameras cannot identify people when behind obstacles with images obtained.

The photo illustrated in FIG. 10B is an example of a perspective image acquired by the see-through camera apparatus, according to an example of the present disclosure. In the perspective image illustrated in FIG. 10B, it can be seen that there is a pedestrian behind the black vehicle located in the front, and the movement of pedestrians may be observed in real-time video. It can also be seen that the pedestrian behind the black car is moving toward the road.

In this manner, according to the see-through camera apparatus, according to an example of the present disclosure, the driver may drive with caution while reducing the speed of the vehicle, thereby being more aware of the surrounding area and potentially avoiding an accident.

The control circuit unit 150 of the see-through camera apparatus, according to an example, may be implemented by a computing environment in which processors (e.g. central processing unit (CPU), graphics processing unit (GPU), microprocessor, Application Specific Integrated Circuit (ASIC), Field Programmable Gate Arrays (FPGA), or the like), a memory (e.g. volatile memory (e.g. RAM, or the like), a non-volatile memory (e.g., ROM, flash memory, or the like), an input device (e.g. keyboard, mouse, pen, voice input device, a touch input device, an infrared cameras, video input devices, or the like), an output device (e.g. displays, speakers, printers, or the like) and a communication access device (e.g., modems, network interface cards (NICs), integrated network interfaces, radio frequency transmitters/receivers, infrared ports, USB interfaces, or the like) are interconnected (e.g., peripheral component interconnection (PCI), USB, firmware (IEEE 1394), optical bus structure, network, or the like).

The computing environment may be implemented as a distributed computing environment, including personal computers, server computers, handheld or laptop devices, mobile devices (mobile phones, PDAs, media players, or the like), multiprocessor systems, consumer electronics, mini computers, mainframe computers, or any of the foregoing systems or devices, but the present disclosure is not limited thereto.

An aspect of the present disclosure is to provide a see-through camera apparatus capable of monitoring movements of people or objects in blind spots caused by obstacles.

As set forth above, according to an example, the monitoring of the movement of an object or person in a blind spot due to an obstacle is disclosed. For example, the effect of generating an image by which an object, such as a pedestrian or a bicycle in an area hidden by obstacles, which could not be observed with the naked eye or a camera image, may be observed is provided.

Accordingly, a perspective image of an area that is obscured by an obstacle and not visible to the driver's field of view may be provided, and by using the perspective image, a blind spot caused by an obstacle may be removed, which may reduce the traffic accident rate and improve safe driving.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A see-through camera apparatus comprising:
    a camera unit configured to acquire a first image of a scene;
    an RF sensor unit configured to receive an RF received signal and obtain a second image of the scene corresponding to a blind spot-object obscured by an obstacle based on the RF received signal; and
    an image processor configured to generate a third image based on a composite of the first image and the second image.

2. The see-through camera apparatus of claim 1, wherein the RF sensor unit is further configured to obtain an image pattern for the blind spot-object and generate the second image including the image pattern, based on the RF received signal.

3. The see-through camera apparatus of claim 1, wherein the RF sensor unit includes
    an antenna unit configured to receive the RF received signal;
    an RF signal processor configured to extract the RF received signal reflected from the blind spot-object, among signals received through the antenna unit; and
    a pattern recognition and data processor configured to recognize an image pattern for the blind spot-object based on the RF received signal, and generate the second image including the image pattern.

4. The see-through camera apparatus of claim 3, wherein the antenna unit includes a multi-array antenna comprising a plurality of antennas.

5. The see-through camera apparatus of claim 1, further comprising a display unit configured to output an image corresponding to the third image to a screen.

6. The see-through camera apparatus of claim 1, wherein the camera unit includes
    an optical unit, including a lens unit including a plurality of lenses, configured to obtain an optical signal reflected from the blind spot-object caused by the obstacle;
    an optical signal processor configured to convert the optical signal acquired by the optical unit into an electrical signal; and
    a data processor configured to acquire the first image based on the electrical signal.

7. The see-through camera apparatus of claim 6, wherein the camera unit further includes
    an actuator unit configured to control movement of the lens unit; and
    a control circuit unit configured to control an operation of the actuator unit.

8. A see-through camera apparatus comprising:
    a camera unit configured to acquire a first image of a scene;
    an RF sensor unit configured to receive an RF received signal and obtain a second image of the scene corresponding to a blind spot-object obscured by an obstacle based on the RF received signal; and
    an image processor configured to generate a third image based on the first image and the second image,
    wherein the image processor is further configured to generate the third image corresponding to a composite image including the pattern image by overlapping the first image corresponding to a surrounding image with the second image including the pattern image corresponding to the blind spot-object.

9. A see-through camera apparatus comprising:
    a camera unit, including a lens unit and an actuator unit, configured to acquire a first image of a scene based on an optical signal incident through the lens unit having a position controlled by the actuator unit;
    an RF sensor unit configured to receive an RF received signal and obtain a second image of the scene corresponding to a blind spot-object obscured by an obstacle based on the RF received signal; and
    an image processor configured to generate a third image by overlapping the first image and the second image, and output the third image to a display unit.

10. The see-through camera apparatus of claim 9, wherein the RF sensor unit is further configured to obtain an image pattern for the blind spot-object, and generate the second image, including the image pattern, based on the RF received signal.

11. The see-through camera apparatus of claim 9, wherein the RF sensor unit includes
    an antenna unit configured to receive the RF received signal;
    an RF signal processing unit configured to extract the RF received signal reflected from the blind spot-object, among signals received through the antenna unit; and
    a pattern recognition and data processing unit configured to recognize an image pattern for the blind spot-object based on the RF received signal, and generate the second image including the image pattern.

12. The see-through camera apparatus of claim 11, wherein the antenna unit includes a multi-array antenna comprising of a plurality of antennas.

13. The see-through camera apparatus of claim 9, further comprising the display unit configured to output the third image to a screen.

14. The see-through camera apparatus of claim 9, wherein the image processor is further configured to generate the third image corresponding to a composite image, including the pattern image, by overlapping the first image corresponding to a surrounding image with the second image including the pattern image corresponding to the blind spot-object.

15. The see-through camera apparatus of claim 9, wherein the camera unit includes an optical unit, including the lens unit, configured to obtain an optical signal reflected from a blind spot-object by the obstacle;

an optical signal processing unit configured to convert the optical signal acquired by the optical unit into an electrical signal; and a data processing unit configured to acquire the first image based on the electrical signal.

16. The see-through camera apparatus of claim 9, wherein the camera unit further includes a control circuit unit configured to control an operation of the actuator unit.

* * * * *